May 11, 1937.  O. WITTEL  2,080,021
MOTION PICTURE APPARATUS CONTROL MECHANISM
Filed Feb. 16, 1935  2 Sheets-Sheet 1

Inventor:
Otto Wittel,
By Newton N. Perrin
George A. Gillette, Jr.
Attorneys

May 11, 1937. O. WITTEL 2,080,021
MOTION PICTURE APPARATUS CONTROL MECHANISM
Filed Feb. 16, 1935 2 Sheets-Sheet 2
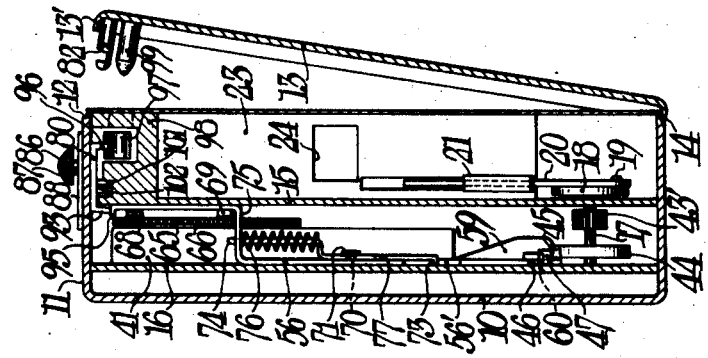
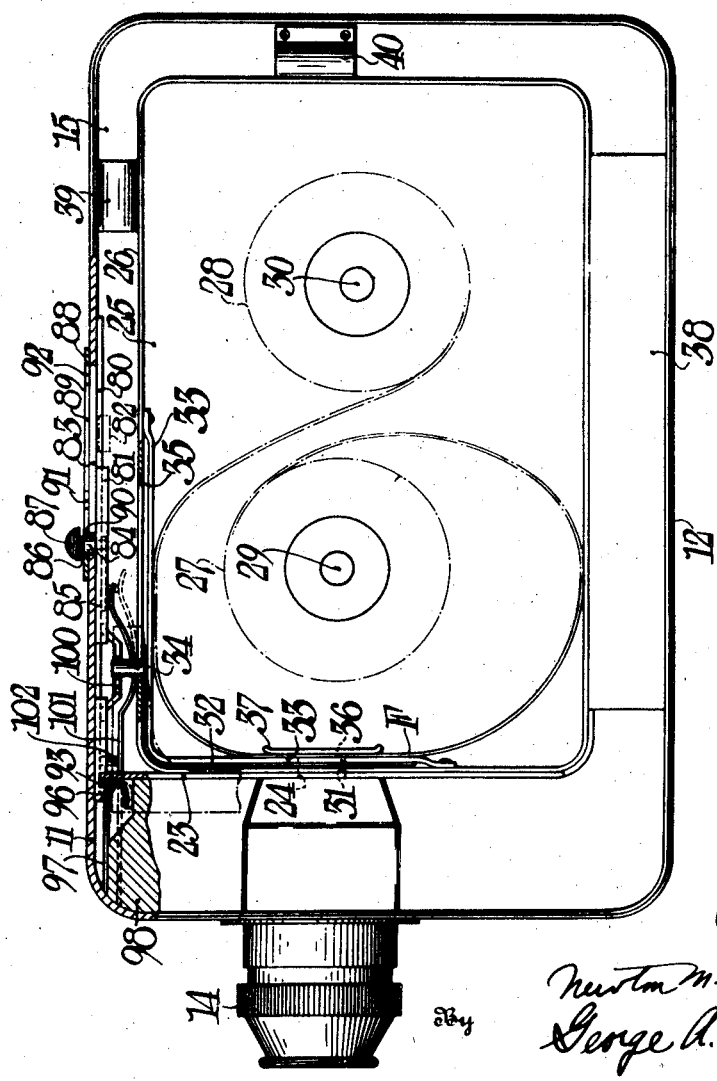
Inventor
Otto Wittel,
By Newton M. Persons
George A. Gillette, Jr.
Attorneys Patented May 11, 1937

2,080,021

UNITED STATES PATENT OFFICE 2,080,021

MOTION PICTURE APPARATUS CONTROL MECHANISM

Otto Wittel, Rochester, N. Y., assignor by mesne assignments to Eastman Kodak Company, Jersey City, N. J., a corporation of New Jersey Application February 16, 1935, Serial No. 6,860

14 Claims. (Cl. 88—17)

The present invention relates to control mechanisms for motion picture apparatus and more particularly to various interlocking arrangements on a motion picture camera of the magazine type.

The many refinements recently incorporated in motion picture apparatus complicate the operation of the apparatus, so that a forgetful operator may spoil the pictures intended to be taken by the camera. When film magazines are provided for cameras, it is, of course, desirable to supply some form of closure means on the film magazine. Such closure means should be opened before the camera is operated and should be closed before removal of the magazine from the camera, in order to prevent fogging of the trailer portions of the film. However, experience establishes that the operation of this closure means should be accomplished automatically, so that the operator can not run the apparatus until the closure means of the magazine is opened and can not remove the magazine from the camera until the closure means has been shut.

It is also essential that an apparatus of the magazine type be stopped with the film advancing claw out of engagement with the film in the magazine. This object may be best accomplished by proper design of the control mechanism, but the spring motor must retain enough strength to move the mechanism into this predetermined stop position. In other words, if the spring motor runs down between predetermined positions of the film advancing claw, then the claw may remain in the film magazine. In order to overcome this difficulty, there should be some cooperation between the spring motor and control mechanism, so that the apparatus will be stopped while there is still sufficient residual energy in the spring motor to bring the film advancing mechanism into the predetermined position to permit free removal of the film magazine.

The primary object of the present invention is the provision in a motion picture apparatus of the magazine type of blocking means for controlling operation of a film moving mechanism and which cooperates with the spring motor and with the mechanism for moving the shutter on the film magazine.

Another object of the invention is the provision of a blocking means for engaging and stopping a film advancing mechanism and which is operated by a control member, and including an intermediate means between the blocking means and the control member, which may be compressed to permit movement of the blocking means independently of the control member.

A further object of the invention is the provision of a latching means for fastening a cover to the casing for the apparatus, which casing encloses the blocking means, the film moving mechanism and the film magazine, and which latching means is connected to the shutter of the film magazine so that said shutter is closed when the latching means is in open position and said shutter is open when the latching means is in locking position.

Still another object of the invention is a cooperative arrangement between the blocking means for the film moving mechanism and the latching means for the cover of the casing, such that the film moving mechanism can not be operated when the latching means is in open position and such that the latching means can not be moved towards open position during operation of the film moving mechanism.

A still further object of the invention is the provision on the casing of the apparatus of a catch which engages the latching means in open position thereof and which does not permit movement of the latching means to locking position until the cover of the casing has been closed.

Other and further objects of the invention will be suggested to those skilled in the art, by the following particular description of the invention.

Reference is hereby made to the accompanying drawings, wherein similar reference characters designate similar elements and wherein:

Fig. 2 is a vertical cross-section, through said motion picture camera, and taken on the line 2—2 of Fig. 1.

Fig. 3 is also a side elevation of a motion picture camera including the features of the invention and which is sectioned to illustrate the latching means and the associated catch.

Figure 1:
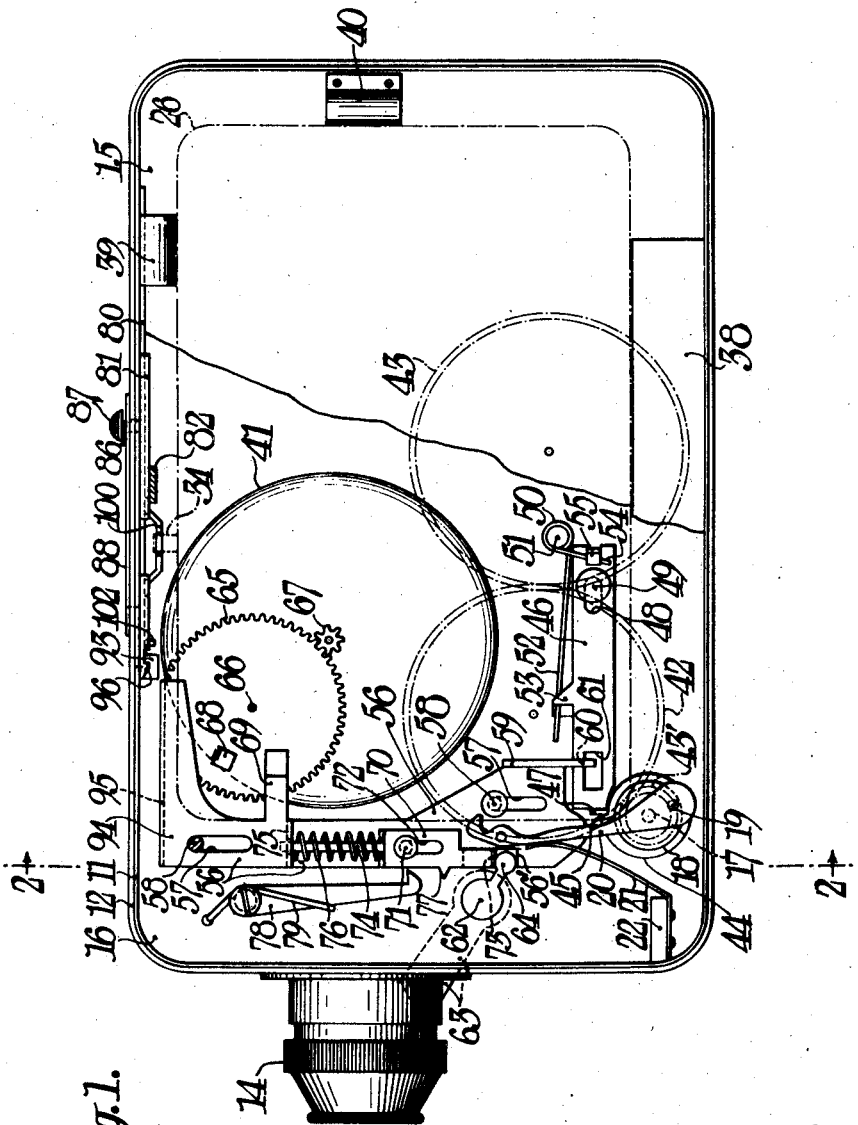
Fig. 1 is a side elevation of a motion picture camera of the magazine type with the cover removed and with part of the mechanism plate broken away, for better illustration of the operating mechanism.

Although the invention is to be described with respect to a motion picture camera, it is understood that the invention may be applied with equal advantage to other types of motion picture apparatus, such as projectors or printers.

The motion picture camera is housed by a casing which has a side wall 10 and a lateral wall 11 extending around the perimeter of side wall 10. The lateral wall 11 is rabbeted at 12 in a known manner. The camera casing is enclosed by a cover 13 which may be hinged at 14 to said casing and which has a rim 13' for light-sealing cooperation with the rabbeted portion 12 of lateral wall 11.

An objective 14 is attached to the front lateral wall 11 of the casing.

A mechanism plate 15 extends longitudinally through the casing and a second mechanism plate 16 is also mounted within the casing in spaced relation to the first named mechanism plate 15.

The film moving mechanism for the apparatus is mounted upon a shaft 17 which is journaled between mechanism plates 15 and 16. The film moving mechanism may be of the ratchet type and may include a disk 18 carrying an eccentric pin 19, upon which the film claw 20 is pivotally mounted. A spring 21 is attached to a bracket 22 and bears against the edge of film claw 20, normally to press the same toward the film gate.

A plate 23 is mounted perpendicularly to mechanism plate 15, is provided with an exposure opening 24 and forms an abutment for the film magazine to be inserted into the camera.

The film magazine is enclosed within a casing, see Fig. 3, which is composed of a side wall 25 and a lateral wall 26 extending around the edge of side wall 25. Film rolls 27 and 28 are mounted in a known manner within the film magazine casing and upon spindles 29 and 30 respectively. The front lateral wall 26 of the magazine casing is provided with an opening 31, which is located to register with the opening 24 in plate 23 when the magazine is positioned within the camera.

A closure means for covering the opening 31 may be constructed in any of several ways. Preferably, the closure means includes a flexible slide 32 and includes a guide member 33, which is riveted at its ends to the lateral wall 26 of the magazine casing and which is intermediately spaced from said lateral wall 26 to form a guideway for the flexible slide 32. A pin 34 is connected to flexible slide 32 and extends through the upper lateral wall 26 of the magazine casing. The said upper lateral wall 26 is provided with a slot 35 through which pin 34 extends and within which pin 34 may move for longitudinal movement of flexible slide 32.

When pin 34 is in the position shown in Fig. 3, the slide 32 covers the opening 31 in wall 26 but, when pin 34 has been moved to the position indicated by dotted lines in Fig. 1, then the lower end of slide 32 is above the opening 31 and the slide may be said to be in open position.

The guide member 33 is provided with an opening 36 in registry with opening 31 and, for registering with the opening 24, when the magazine is located in the camera. The film gate is illustrated as being located within the film magazine and is composed in part of guide member 33 and in part of presser member 37 mounted in any suitable manner in juxtaposition to the opening 36 in guide member 33. The film F is threaded between guide member 33 and presser member 37 and may be conducted from the supply film roll 28 and to the take-up roll 27 in any desired path. The film path disclosed in my copending application, Serial No. 620,176, filed June 30, 1932 is preferred.

A magazine locating member 38 is provided along the lower lateral wall 11 of the camera casing. Springs 39 and 40 are provided, respectively, adjacent the upper and rear portions of lateral wall 11 and are adapted to engage the lateral wall 26 of the film magazine to place it in proper position against plate 23 and locating member 38 and with openings 31 and 36 of the magazine in registry with opening 24 in plate 23.

The motive power for the camera is preferably a spring motor, which is enclosed within a housing 41 riveted to the second mechanism plate 16. In a known manner, the spring motor drives a gear, not shown, which in turn drives the other gears 42 and 43, indicated by the dot-dash lines in Fig. 1, and journaled in mechanism plates 15 and 16. The gear 42 meshes with a small pinion gear 43' on shaft 17 to drive the film advancing mechanism. The film advancing or film moving mechanism includes, in addition to the pull-down claw 20, a movable member which may be engaged to stop the film moving mechanism. Such a movable member may assume various forms, or may be a single toothed cam 44, which is mounted upon shaft 17, and which may have an abutment 45.

A blocking means supervises or contributes to the control of the various means or mechanisms in the camera. Such a blocking means may include a stop member for engaging the movable member of the film advancing mechanism to stop the operation of said mechanism and may also include a movable bar, which may be manually controlled by the operator, which may interlock with the latching mechanism for the casing, and which may cooperate with control member actuated by the spring motor.

The stop member of the blocking means may be composed of stop lever 46, which carries a flange 47 for actually engaging the abutment 45 on single toothed cam 44, and may be provided, near the other end, with an elongated slot 48 extending longitudinally of stop lever 46. Stop lever 46 is loosely pivoted upon the second mechanism plate 16 by means of a headed stud 49, which is mounted on plate 16 and which extends through elongated slot 48.

A resilient means acts upon the stop lever 46, both to urge the stop lever normally into engagement with the movable member of the film moving mechanism and to provide a shock absorbing action when the engagement takes place. Such a resilient means may be supplied as a coil spring 50 encircling a pin 51 on mechanism plate 16, having one end 52 engaging between a pair of diverging fins 53 on stop lever 46 and having the other end 54 in engagement with a tongue 55 bent from stop lever 46. The coil spring 50 performs a dual function; first, the spring end 52 normally moves stop lever 46 in a counter-clockwise direction and into engagement with the abutment 45 on single toothed cam 44 and, secondly, the other spring end 54 normally moves stop lever 46 radially toward said abutment 45, with the stud 49 at the right hand side of elongated slot 48. As a result of this second function of coil spring 50, the impact of abutment 45 striking the flange 47 of lever 46 is first absorbed by said spring end 54. Then, after the cam 44 has stopped, spring end 54 will give up the energy stored by reason of said impact and will move lever 46 back to the position shown in Fig. 1.

The blocking means also includes a movable bar which is slidably mounted and which actuates the stop member just described. The bar 56 is quite irregular in contour and is provided with elongated slots 57 engaging headed studs 58 on the second mechanism plate 16. A perpendicular flange 59 is integral with bar 56 and carries a hook 60, which enters a slot 61 provided in stop lever 46. It is clear that when bar 56 is slid upwardly, the hook 60 raises stop lever 46, so that the abutment 45 will clear flange 47 and so that the spring motor may operate the film moving mechanism. When the bar 56 is moved downwardly to the position shown in Fig. 1, then the end 52 of coil spring 50 functions to rotate stop lever 46 in anti-clockwise direction and to bring flange 47 into engagement with abutment 45 and prevent further operation of the film moving mechanism.

A control member, of the usual type, engages bar 56 and extends to the exterior of the camera for manual operation by the operator. Control member 62 is journaled in side wall 10 of the camera casing and in the second mechanism plate 16, has a finger lever 63 to provide the operator with a mechanical advantage in its operation, and has a projection 64 for engaging notch 56' in bar 56 and for sliding said bar 56 with respect to the headed studs 58. When finger lever 63 is pressed downwardly by the operator, then the movable bar 56 assumes the upward position with stop lever 46 out of engagement with single toothed cam 44. The resilient action of coil spring 50, through its spring end 52, normally returns stop lever 46, movable bar 50, and control member 62, to the position shown in Fig. 1 with finger lever 63 in upward position and with flange 47 in engagement with abutment 45.

A second control member operates upon the movable bar 56 to compel engagement of stop lever 46 with single toothed cam 44, when the spring motor has been unwound a predetermined amount. This second control member comprises a large pinion gear 65 rotating on a shaft 66, which is mounted on the spring motor housing 41. A small pinion gear 67 is located on the end of the spring motor shaft and meshes with said large pinion gear 65. A lug 68 is provided on the surface of large pinion gear 65. An arm 69 extends from movable bar 56 and is preferably integral therewith. Lug 68 and arm 69 are respectively so located and arranged upon large pinion gear 65 and movable bar 56 that lug 68 will engage arm 69 to move the blocking means with stop lever 46 into engagement with cam 44, just prior to complete unwinding of the spring motor. In other words, the control member, operated by the spring motor compels engagement of the blocking member, while there is still enough resilient energy in the spring motor to move the film moving mechanism and single toothed cam 44 into engagement with stop lever 46.

As a result, it is never possible completely to unwind the spring motor and to permit the film moving mechanism to stop in that intermediate position, or a position other than that shown in Fig. 1. The advantage of always stopping the film moving mechanism in the same predetermined position is that the camera can never be stopped with the film claw 20 extending into the film magazine. Otherwise, the claw 20 might be damaged upon removal of the film magazine or the film might be torn upon such removal.

With the construction thus far described, it would be possible to seriously damage the blocking means and the second control member, if the finger lever 63 was held down firmly in spite of the action of the lug 68 on the movable bar and some part of these control means might be broken or damaged. Such a result occurred in actual practice and suggested the protective feature next to be described.

An intermediate means is inserted between the projection 64 of control member 62 and the movable bar 56. This intermediate means is compressible, so that the movable bar 56 can be moved under the action of lug 68 of the second control member to permit movement of the stop lever 46 into engagement independently of the position of finger lever 63 or projection 64 of control member 62. Said intermediate means comprises a slide 70, which is connected to movable bar 56 by a headed stud 71 and elongated slot 72. The slide 70 carries a flange 73, which extends into the notch 56' in bar 56. The other end of slide 70 is formed into a stem 74, which is displaced from the plane of slide 70 but parallel thereto. The movable bar 56 is provided with a step 75 into which the step 74 of the slide 70 extends.

A coil spring 76 encircles stem 74 and normally maintains slide 70 in the position shown in Fig. 1, with flange 73 bearing against the edge of projection 64. Operation of control member 62 is ordinarily through the medium of this intermediate means or through the medium of slide 70 and spring 76, causing movable bar 56 to be raised. Oppositely, the movable bar 56 can be lowered by the action of end 52 of coil spring 60 to raise finger lever 63 of control member 62. However, if the operator insists on holding the finger lever 63 in running position and if the control member, under the supervision of the spring motor, acts to move bar 56 downwardly, then spring 76 will become compressed and the bar 56 may be moved independently of the control member 62 or finger lever 63.

An arrangement for temporarily maintaining the blocking means in running position includes a nose 77 extending from the edge of bar 56 and includes a pawl 78 pivoted on mechanism plate 16 and normally urged in a counter-clockwise direction by a spring 79. When the finger lever 63 is depressed to raise bar 56, then the nose 77 will cam against the end of pawl 78 and move into engagement with the tooth of said pawl. In this position, the blocking means and manual control member 63 will normally remain in running condition until the finger lever 63 is released, whereupon spring end 52 returns the blocking means and stop lever 46 to engaging or stopping position.

A latching means is located on the upper lateral wall 11 of the camera casing. This latching means includes a slide 80, which has a flange 81. A notched projection 82 is mounted on the cover 13 and extends into the camera casing upon closing of cover 13, so that the flange 81 of slide 80 will engage the notch of projection 82 to lock the cover in closed position. The upper lateral wall of the camera casing is provided with an elongated opening 83. A pin 84 is attached to a leaf spring 85 on slide 80 and extends through elongated opening 83. Said pin 84 has a restricted portion 86 and a head 87. A cover-plate 88 is mounted over elongated opening 83, has a slot 89 equal in width to the diameter of restricted portion 86 and has holes 90, 91 and 92, equal in diameter to the diameter of pin 84. Holes 90 and 92 are located at opposite ends of slot 89, while the other hole 91 is located near the hole 90. The slide 80 is provided with a fin 93 on the edge opposite the flange 81. The upper end of movable bar 56 includes an enlarged portion 94 carrying a flange 95. Fin 93 is so located on slide 80 that it will engage the flange 95 on movable bar 56 in all positions of the latching means, except when pin 84 is in the extreme right end of elongated opening 83. The latching means, see Fig. 3, is in unlocking position when the pin 84 is in the extreme left end of elongated opening 83. In this position of pin 84, slide 80 is in its extreme left end position and fin 93 abuts against flange 95 of movable bar 56. Obviously, the movable bar 56 cannot be raised for operation of the camera mechanism. Pin 84 may be depressed against the action of leaf spring 85 and to bring restricted portion 86 to the level of the slot 89 in cover plate 88. With pin 84 depressed in this manner, the slide 80 can now be moved to the right until pin 84 registers with hole 91.

If pin 84 is released, then leaf spring 85 will move pin 84 into hole 91. In this intermediate position of the latching means, the fin 93 is also in abutment with flange 95 and the camera can not be operated. However, if the bar 84 is again depressed and moved to the extreme right of elongated opening 83, then fin 93 will clear flange 95 and the camera can be operated.

A tooth 96 is provided on slide 80 in line with flange 81. A leaf spring 97 is mounted within a recess in a camera block 98. The leaf spring 97 is provided with a notch, not shown, which receives the tooth 96 in the left hand extreme position of slide 80. During engagement of leaf spring 97 and tooth 96, the slide 80 can not be moved. A tapered pin 99 is mounted on the cover 13 and is located so that, when cover 13 is closed, pin 99 engages leaf spring 97 to move the same out of engagement with tooth 96. The arrangements and parts just described will not permit movement of the latching means until the cover for the casing is closed.

The latching means also cooperates with the flexible slide 32 on the film magazine to move it into appropriate positions corresponding to the locking and unlocking positions of the latching means. For this purpose, a seat 100 is mounted upon slide 80 and is recessed to receive the pin 34 on the slide 32 of the film magazine. Since the leaf spring 97 will not permit movement of slide 80 until the cover 13 is closed, the same position of seat 100 is assured whenever the cover 13 can be opened, for insertion of a film magazine. Otherwise, slide 80 might be in an intermediate position with the cover 13 open and pin 34 would not fit into the seat 100 and the necessary cooperation for opening slide 32 would not take place upon movement of the latching means to locking position.

In the position of pins 34 and 84 shown in Fig. 3, the latching means is in unlocking position, fin 93 blocks flange 95 to prevent movement of bar 56 and operation of the camera, leaf spring 97 engages tooth 96 to prevent movement of slide 80, and the flexible slide 32 is in closed position with respect to the openings 31 and 36. The pin 84 may be depressed and moved a short distance to the right and into engagement with hole 91. In this intermediate position of the latching means, the cover 13 is locked to the camera casing, fin 93 still blocks flange 95 to prevent operation of the camera, but leaf spring 97 is no longer in engagement with tooth 96, nor has flexible slide 32 yet uncovered openings 31 and 36 of the film magazine. In this intermediate position of the latching means, the camera can not be operated, and the film magazine is still sealed against light leakage. Again depressing pin 84 and moving it to the extreme right in opening 83 and into registry with hole 92 brings fin 93 beyond the end of flange 95, so that the movable bar 56 may be raised for operation of the camera; at the same time pin 34 on the film magazine has also been moved to the extreme right and the flexible slide 32 no longer covers openings 31 and 36, through which the film may be exposed. It should be noted that, with pin 84 in the extreme right or running position that, upon raising movable bar 56, the end of flange 95 will block fin 93 to prevent initiation of an unlocking movement during operation of the camera.

One great problem, in the provision of cameras of the magazine type, is the accurate positioning of the film magazine within the camera. To this end, the springs 39 and 40 are provided. In addition, an elongated spring 101 is mounted in the camera block 98 and extends into the magazine chamber of the camera. The spring 101 has a sinuous contour and is normally in raised position. After the film magazine has been inserted and after the cover 13 has been closed, a pin 102 on slide 80 moves into engagement with the outer end of elongated spring 101 when the latching means is moved into its extreme right hand position. Thus, just prior to the unblocking of the movable bar 56, a pressure is exerted on spring 101 to further insure proper location of the film magazine and proper registration between opening 24 in the camera plate 23, and opening 31 in the lateral wall 26 of the film magazine.

It will be noted that the various members, means and mechanisms according to the invention all cooperate either directly with each other or indirectly through one of the other mechanisms. The combined result of said means, members and mechanisms is to provide an apparatus of the magazine type which is quite automatically placed in condition for proper operation or placed in condition so that improper operation can not occur. Many modifications of the disclosed features of the invention may be effected by equivalent structures, but all such structures which come within the scope of the appended claims are deemed to be within the present invention.

Having now particularly described my invention what I desire to secure by Letters Patent of the United States and what I claim is:

1. In a motion picture apparatus, the combination with a film moving mechanism including a movable member which is adapted to be engaged to stop the operation of said mechanism, blocking means including a stop member movable into engagement with said movable member to stop said film moving mechanism, and a control member for moving said blocking means to move said stop member into and out of engagement with said movable member of the film moving mechanism, of an intermediate means for normally causing movement of said blocking means with said control member and including a resilient element which may be compressed to permit movement of said stop member into engagement with said movable member independently of said control means and to stop said mechanism.

2. In a motion picture apparatus, the combination with a film moving mechanism including a movable member which is adapted to be engaged to stop the operation of said mechanism, a spring motor for driving said film moving mechanism, blocking means including a stop member movable into engagement with said movable member to stop said film moving mechanism, a control member for moving the stop member of said blocking means into and out of engagement with said movable member of the film moving mechanism, and a second control member operated by said spring motor and for engaging and moving the stop member of said blocking means into engagement with said movable member to stop said film moving mechanism after a predetermined unwinding of said spring motor, and an intermediate means for normally causing movement of said blocking means with the first-mentioned control member and including a resilient element which may be compressed to permit movement of the stop member of said blocking means under the action of said second-mentioned control member, into engagement with said movable member to stop said mechanism independently of said first-mentioned control member and after predetermined unwinding of said spring motor.

3. In a motion picture apparatus, the combination with a film moving mechanism including a movable member which is adapted to be engaged to stop the operation of said mechanism, and a blocking means including a stop member movable into engagement with said movable member to stop said film moving mechanism, of a loose connection for movably supporting the stop member of said blocking means for rotation and longitudinal movement, and a single spring member engaging said stop member, for normally rotating said stop member into engagement with said movable member and for absorbing some of the impact causing longitudinal movement of said stop member when such engagement occurs.

4. In a motion picture apparatus, the combination with a film moving mechanism including a movable member having an abutment, and a stop lever provided with a slot and for engaging the abutment on said movable member to stop said film moving mechanism, of a pin for supporting said stop lever and loosely fitting into said slot thereof, and a single spring member engaging said stop lever, normally rotating the same for engagement with said abutment and normally urging said stop lever longitudinally, and for absorbing the impact when said stop lever is moved into engagement with the abutment on said movable member to stop said film moving mechanism.

5. In a controlling mechanism for a film moving mechanism, the combination with a blocking means including a stop member for engaging and stopping said film moving mechanism and including a bar which is provided with a notch, a slide movably mounted on said bar and having an edge in spaced relation to one side of said notch, and a control member including a part extending into said notch, of a spring between said bar and said slide and for normally pressing said edge against said part which is in turn pressed against one edge of said notch but permitting movement of said bar into a position for engagement of the stop member with said film moving mechanism without movement of said slide and part.

6. In a controlling mechanism for a film moving mechanism, the combination with a blocking means including a stop member for engaging and stopping said film moving mechanism and including a bar which is provided with a notch, a slide movably mounted on said bar and having a flange extending into said notch and in spaced relation to one side of said notch, and a control member including a part extending into said notch, of a spring between said bar and said slide and for normally pressing said flange against said part but permitting displacement of said movable bar into a position for engagement of the stop member of said blocking means with said film moving mechanism without corresponding movement of said slide and part, the flange of said slide engaging an edge of said notch to limit said displacement between the slide and bar.

7. In a motion picture camera, the combination with a film moving mechanism including a movable member which is adapted to be engaged to stop the operation of said mechanism, blocking means movable into engagement with said movable member, a film magazine provided with an exposure aperture and having a closure member movable to closed and opened positions with respect to said aperture, and a casing having a cover and for enclosing said film magazine, said film moving mechnism and said blocking means, of a latching means between said cover and said casing, movable to a locking position to fasten said cover to said casing and movable to an unlocking position to permit opening of said cover, and including a part for engaging said blocking means in unlocking position of said latching means to prevent disengagement of said blocking means and the movable member of said film moving mechanism and preventing operation thereof.

8. In a motion picture camera, the combination with a film moving mechanism including a movable member which is adapted to be engaged to stop the operation of said mechanism, blocking means movable into engagement with said movable member, a film magazine provided with an exposure aperture and having a closure member movable to closed and opened positions with respect to said aperture, and a casing having a cover and for enclosing said film magazine, said film moving mechanism and said blocking means, of a latching means between said cover and said casing, movable to a locking position to fasten said cover to said casing and movable to an unlocking position to permit opening of said cover, including a part for abutting said blocking means in unlocking position of said latching means to prevent operation of said film moving mechanism, and including a connection for engaging the closure member on said film magazine, for moving said closure member to opened position in locking position of said latching means, and for moving said closure member to closed position in unlocking position of said latching means.

9. In a motion picture camera, the combination with a film moving mechanism including a movable member which is adapted to be engaged to stop the operation of said mechanism, blocking means movable into engagement with said movable member, a film magazine provided with an exposure aperture and having a closure member movable to closed and opened positions with respect to said aperture, and a casing having a cover and for enclosing said film magazine, said film moving mechanism and said blocking means, of a latching means between said cover and said casing, movable to a locking position to fasten said cover to said casing, to an unlocking position to permit opening of said cover, and to an intermediate position in which intermediate position the cover is also fastened to said casing, including a part for engaging said blocking means in the unlocking and the intermediate positions of said latching means to prevent disengagement of said blocking means, and including a connection for engaging the closure member of said film magazine, for moving said closure member to opened position in locking position of said latching means, and for moving said closure member to closed position in the unlocking and intermediate positions of said latching means.

10. In a motion picture camera, the combination with a film moving mechanism including a movable member which is adapted to be engaged to stop the operation of said mechanism, blocking means movable into engagement with said movable member, and a casing having a cover and for enclosing said film moving mechanism and said blocking means, of a latching means between said cover and said casing, movable to a locking position to fasten said cover to said casing, movable to an unlocking position to permit opening of said cover, and movable to an intermediate position in which the cover is also fastened to said casing, and including a part for engaging said blocking means in unlocking and intermediate positions of said latching means to prevent disengagement of said blocking means.

11. In a motion picture camera, the combination with a film moving mechanism including a movable member which is adapted to be engaged to stop the operation of said mechanism, blocking means movable into engagement with said movable member, and a casing having a cover and for enclosing said film moving mechanism and said blocking means, of a latching means between said cover and said casing, movable to a locking position to fasten said cover to said casing, movable to an unlocking position to permit opening of said cover, and movable to an intermediate position in which the cover is also fastened to said casing, and including a part for engaging said blocking means in unlocking and intermediate positions of said latching means to prevent disengagement of said blocking means, a catch normally engaging said latching means in unlocking position thereof and for preventing movement of said latching means, and a projection for engaging said catch only in closed position of said cover and moving said catch out of engagement with said latching means to permit movement of said latching means only when said cover is closed.

12. In a motion picture camera, the combination with a film magazine provided with an aperture and having a closure member movable to closed position and to open position with respect to said aperture, a casing for containing said film magazine, and a cover for enclosing said magazine within said casing, of a latching means between said cover and said casing and movable to a locking position to fasten said cover to said casing and movable to an unlocking position to permit opening of said cover, and including a connection for detachably engaging the closure member of said film magazine, a catch for engaging said latching means and for preventing movement of said latching means from unlocking position, and a projection for engaging said catch only in closed position of said cover and for moving said catch out of engagement with said latching means, whereby said cover cannot be opened until said connection is in a definite predetermined position.

13. In a motion picture camera, the combination with a film magazine provided with an aperture and having a closure member slidably movable to closed and opened positions with respect to said aperture, a casing for containing said film magazine, and a cover for enclosing said magazine within said casing, of a latching means between said cover and said casing, including a bar slidably mounted upon said casing and movable to a locking position and to an unlocking position with respect to said cover, and including a jaw on said bar for detachably engaging the closure member on said magazine only when said magazine is within said casing.

14. In a motion picture camera, the combination with a film magazine, a casing providing a magazine chamber, a cover for enclosing said magazine within said casing, and a spring within said casing for positioning said magazine, of a latching means between said cover and said casing, including a movable bar movable to a locking position and to an unlocking position with respect to said cover, and including a protuberance on said bar and for engaging and pressing said spring against said magazine upon movement of said bar to locking position.

OTTO WITTEL.